United States Patent [19]

Wangler et al.

[11] Patent Number: 5,371,581
[45] Date of Patent: Dec. 6, 1994

[54] HELICOPTER OBSTACLE WARNING SYSTEM

[75] Inventors: Richard J. Wangler, Maitland; Keith L. Fowler, Orlando; Robert E. McConnell, II, Longwood, all of Fla.

[73] Assignee: Schwartz Electro-Optics, Inc., Orlando, Fla.

[21] Appl. No.: 27,866

[22] Filed: Mar. 8, 1993

[51] Int. Cl.⁵ .............. G01C 3/08; G08B 21/00; G08B 23/00; G08G 5/04
[52] U.S. Cl. .................... 356/5; 340/946; 340/961; 340/963; 356/141.1
[58] Field of Search .......... 340/946, 961, 963; 356/5, 141.1

[56] References Cited

U.S. PATENT DOCUMENTS

| | | | |
|---|---|---|---|
| 3,810,139 | 5/1974 | Fergusson | 340/229 |
| 4,572,662 | 2/1986 | Silverman | 356/5 |
| 4,695,013 | 9/1987 | Trampnau | 340/946 |
| 4,902,126 | 2/1990 | Koechner | 356/5 |
| 4,916,445 | 4/1990 | Crossley | 340/946 |
| 4,995,722 | 2/1991 | Sutour | 356/152 |
| 5,210,586 | 5/1993 | Grage et al. | 356/5 |

Primary Examiner—Stephen C. Buczinski
Attorney, Agent, or Firm—William M. Hobby, III

[57] ABSTRACT

A helicopter hazardous ground object warning system has a horizontally rotating beam from a laser rangefinder which detects and measures the distance to ground objects which may present a hazard to a helicopter during hover, takeoff and landing. The rotating laser beam from the rangefinder is positioned on the fuselage of a helicopter to create a quasi-horizontal (planar) scan pattern parallel to the earth's surface. The maximum and minimum ranges which can be measured by the rangefinder to objects and to ground personnel are preset. The minimum range can be used for blanking range measurements as a function of angle from helicopter parts, such as landing skids or wheel structures. A pilot warning system for hazardous objects may include an audible or visual alarm which may include a screen positioning all objects relative to the helicopter rotors and an external audible personnel warning system alerting ground personnel in the hazardous zone.

19 Claims, 6 Drawing Sheets

HELICOPTER OBSTACLE WARNING SYSTEM

BACKGROUND OF THE INVENTION

The present invention relates to a helicopter hazardous ground object warning system and especially to a warning system for alerting a helicopter pilot during hover, takeoff or landing that the helicopter's main rotor blade, tail rotor blade, and/or fuselage are approaching a ground based object which would be hazardous to the helicopter in a collision and for alerting ground personnel who may be walking in the near vicinity of a landed helicopter along a path which intersects or comes close to an operating rotor.

Accident studies have indicated that a high percentage of helicopter accidents during hover, takeoff and landing involve collisions between the tail or main rotor blades and ground based objects that were not seen or were neglected or forgotten by the pilot because of other pilot distractions at the time of the accident. These studies also indicate that the primary cause of ground personnel accidents is ground personnel walking into moving main or tail rotor blades. In addition, helicopters have had the problem of hitting electrical or communication wires which are difficult to see by a low-flying helicopter and can result in the loss of the helicopter and crew by the helicopter colliding with pylons, radio masts, and cables during either actual missions, training exercises or the like when the helicopter is flying at low altitudes. This is especially true in the case of military use of helicopters, such as in combat, rescue missions, and the like, in which the helicopters are flying at low altitudes.

A considerable effort has been expended in solving the problem of low flying helicopters hitting wires. Prior techniques have been used which include microwave and millimeter wave radar systems, an infrared based radar system employing a carbon dioxide laser and a passive system which detects the magnetic flux from a live transmission line. Each of these prior techniques has certain inherent drawbacks which make them unsatisfactory in some circumstances. The microwave and millimeter wave radar systems are characterized by long wavelengths and, because of the specular reflection of metal surfaces at these wavelengths, wires and cables are difficult to detect. Also, emission from microwave and millimeter radar transmitters is propagated over large distances and over a broad area which causes much ground clutter. A carbon dioxide laser radar, which operates in the mid-infrared region at a wavelength of 10.6 micrometers, is capable of detecting small obstacles. However, the laser radar requires a scanning mirror system which deflects the transmitted stream of laser pulses over a large field-of-view to intercept an object, such as a cable, and a special laser detector for detection of the reflected laser pulses. The magnetic flux detection system is useful only within ranges too short for obstacle avoidance so that cables purposely deployed across valleys and the like to intercept helicopters cannot be detected using a magnetic flux system.

Finally, it has been suggested to use a wire obstacle avoidance system for helicopters, such as taught in the Koechner, U.S. Pat. No. 4,902,126, which uses a solid state laser transmitter for emitting radiation in the near-infrared wavelength region and uses a beam dividing device or a plurality of laser diode arrays for generating separate laser beam lobes which are passed through an objective lens for deflection in slightly different directions to define a field of coverage in front of the helicopter. A wire obstacle in the field of coverage intercepts one or more of the lobes and reflects signals to a receiver detector array which compares the time of the return signal with the time of transmitted laser lobes with the difference therebetween being a function of the range between the obstacle and the helicopter. The range information can then be displayed to the pilot in time to take evasive action.

There is also a wide variety of patents describing systems which are used for automatically detecting the presence or absence of one land vehicle in front of another. There are also several patents for obstacle sensors, such as shown in the Wada et al., U.S. Pat. No. 5,076,384, for an ultrasonic obstacle sensor. A number of prior patents deal with automatically guided vehicles in warehouses and the like, and some of these, such as the Field, U.S. Pat. No. 5,020,620, use a laser guided system.

In contrast to these prior systems, the present helicopter hazardous ground object warning system is not only suitable for recognizing wires but is designed specifically to avoid hazardous ground objects which can completely surround the helicopter when the helicopter is hovering or is taking off or landing. These obstacles might be in line with the main rotor blade, the tail rotor blade, or the fuselage so that a pilot warning can prevent a collision. Thus, the helicopter warning system of the present invention can be used for the tail rotor blade and tail of the vehicle covering a plane of (plus or minus) 180° or 360° around the bottom of the fuselage of the helicopter. The minimum range can be set such that helicopter components, such as the landing skids, will be blanked out as the sweeping laser beam rotates thereby. Also, a second feature of the subject invention is the warning it can provide to ground personnel walking in the vicinity of a landed helicopter with main and tail rotor blades still operating thereby preventing them from walking into the rotors.

SUMMARY OF THE INVENTION

The present invention relates to a helicopter hazardous ground object warning system which includes a helicopter having a fuselage and at least one rotor having a plurality of blades attached thereto. A laser rangefinder is mounted to the helicopter and has a beam rotation system for rotating the laser transmitted beam of a laser rangefinder and for receiving a returning reflected light signal for the rangefinder receiver. The laser rangefinder includes a data processing computer for processing the rangefinder data to issue a warning signal to the pilot which may be audible or visual on a screen to give the position of the obstacle to the helicopter pilot and to ground personnel which is audible to warn them of approaching rotors. The laser rangefinder has means for adjusting the minimum and maximum range and the minimum range can be adjusted via data processing software to blank out return signals from helicopter components. Rotating mirrored optics are mounted to the bottom of the fuselage of the helicopter which are driven by an electric motor. Mirrors and prisms can be rotated to scan the laser beam over a predetermined path. The present invention also provides for a hazardous ground object warning method for helicopters including transmitting a laser rangefinder beam from a helicopter, rotating the transmitted and received beam in a horizonal plane or modified horizontal plane beneath the lower fuselage of the helicopter, receiving a signal reflected from an object, setting the minimum and maximum ranges of operation of the laser rangefinder, and generating a warning signal for hazardous objects within the minimum and maximum range settings so that a pilot is warned of objects within a predetermined range of the helicopter. The invention also computes the paths of ground personnel and provides an audible exterior personnel warning signal to warn ground personnel in the hazardous zone.

BRIEF DESCRIPTION OF THE DRAWING

Other objects, features and advantages of the present invention will be apparent from the written description and the drawings in which.

DESCRIPTION OF THE PREFERRED EMBODIMENTS

Figure 1:
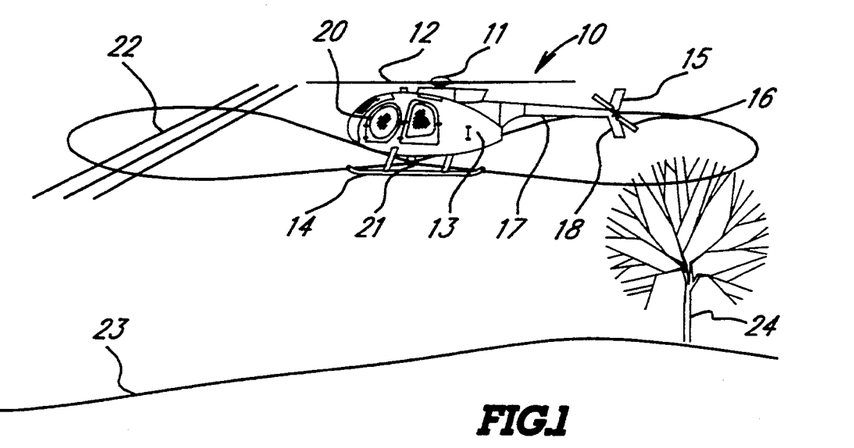
FIG. 1 is a side elevation of a helicopter hovering over the earth with a laser scanning beam.

Referring to the drawing and especially to FIGS. 1-4, a helicopter 10 is illustrated having a rotor 11 having a plurality of rotor blades 12. The helicopter 10 has a fuselage 13 with skids 14 for use in landing and has a tail fin 15 along with an anti-torque tail rotor 16. The main fuselage is connected with a tail boom 17 to the horizontal stabilizers 18 and to the tail fin 15. The flight deck 20 houses the pilot in the helicopter 10. FIG. 1 has the present helicopter hazardous ground object warning system rotating optics 21 protruding from the bottom portion of the fuselage 13 and a scanning laser beam 22 is shown diagrammatically being emitted from the optics 21. The helicopter 10 is shown flying over the surface 23 of the earth and has tree obstacle 24 in FIG. 1.

Figure 2:
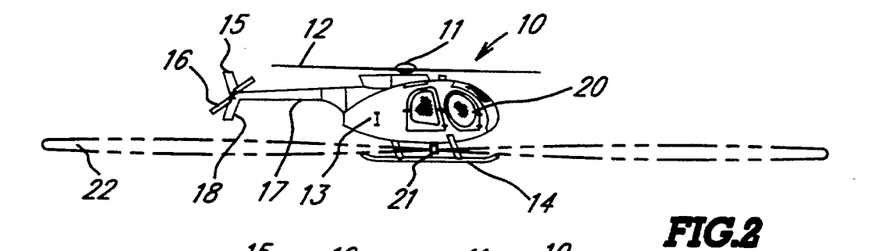
FIG. 2 is a side elevation of a helicopter in accordance with FIG. 1 showing one possible position of the beam scanning mirror.
Figure 3:
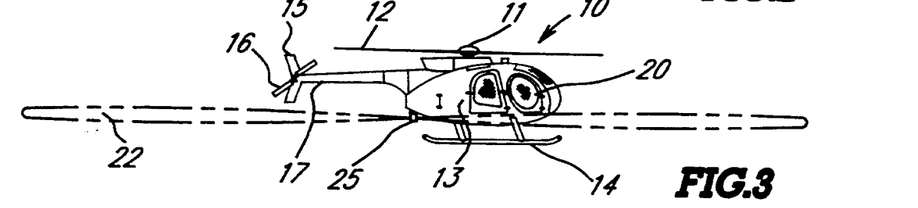
FIG. 3 is a side elevation in accordance with FIGS. 1 and 2 having the beam scanning optics positioned to the rear of the main fuselage.

FIG. 3 is modified from the embodiment of FIGS. 1 and 2 in that the rotating optics 25, which are the same as the rotating optics 21 of FIGS. 1 and 2, are placed in a different position on the helicopter 10 on the bottom side and to the rear of the main fuselage 13 where better coverage can be had of the tail boom 17 anti-torque tail rotor 16 and tail fin 15.

Figure 4:
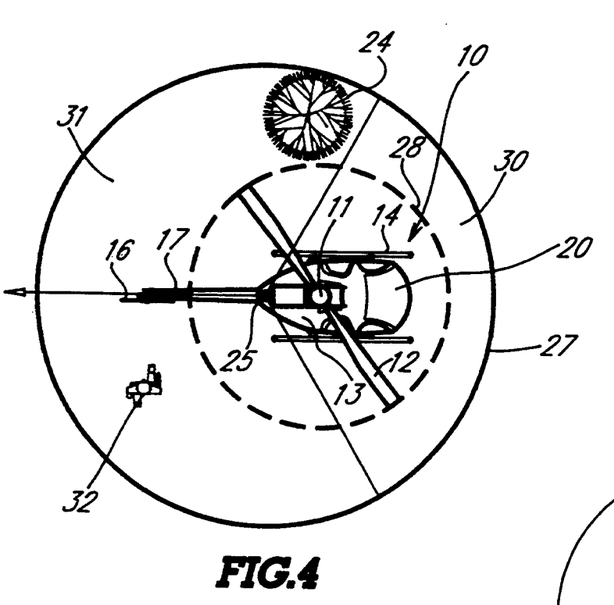
FIG. 4 is a top plan view of a helicopter of FIGS. 1 through 3 illustrating the scanning pattern of the embodiment of FIG. 3.

FIG. 4 shows a top plan view of the embodiment of FIG. 3 having a tree obstacle 24 within the hazardous warning zone or area of coverage illustrated by the circle 27 showing the scanning laser beam 22 in maximum coverage and also showing a circle 28 as the coverage of the main rotor blades 12. The area 30 provides complete coverage against obstacles while the shaded area 31 provides partial coverage. A man 32 is shown as an obstacle in the coverage area and in a position if the helicopter tail boom 17 is swung around the anti-torque tail rotor blades 16 would intercept the man 32 or alternatively if the helicopter is landed and the mans ground path continues forwards, he will run into the anti-torque tail rotor blades 16.

Figure 5:
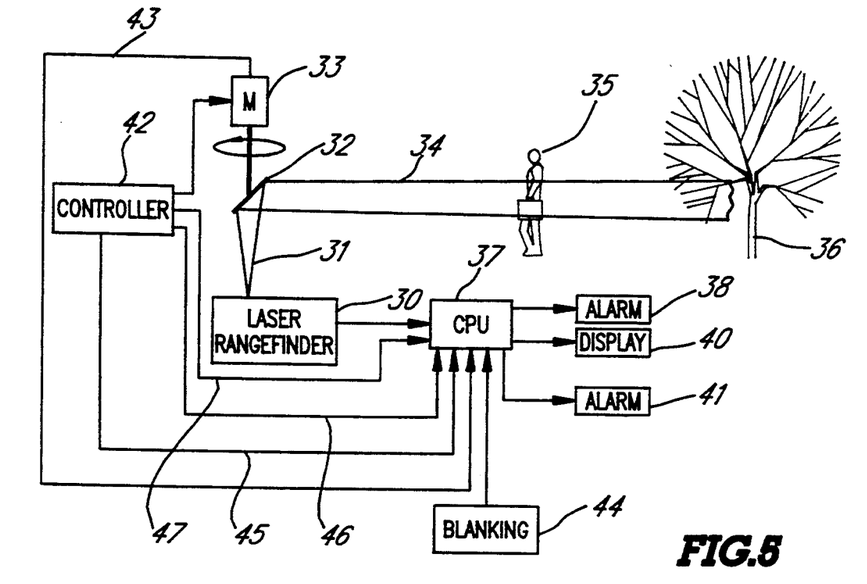
FIG. 5 is a block diagram of the helicopter hazardous ground object warning system in accordance with the present invention.

Turning to FIG. 5, a helicopter hazardous ground object warning system is illustrated in block and diagrammatic form in which a laser rangefinder transceiver 30 generates a laser beam 31 which impinges upon mirrored optics 32, which may be a mirror or a mirror plus a prism, which are being rotated by an electric motor 33 which rotates the optics 32 to rotate the beam 34 in a circular or modified circular pattern. The rotating optics 21 of FIGS. 1 and 2 and 25 of FIGS. 3 and 4 contain the rotating optics 32 which are rotating the scanning laser beam 34 which indicates in FIG. 5 that a man 35 and a tree 36 are obstacles within the scanning pattern. The lightbeam 34 impinges upon the man 35 and the tree 36 and gives a reflected lightbeam which is picked up by the rotating mirrored surface 32 and fed back to the rangefinder transceiver 30. This return signal is fed to the data processing unit 37 which produces a pilot audible warning 38, a pilot visual warning display 40 on a screen to position the obstacles for the pilot (FIG. 6) and also produces a ground personnel audible warning 41 to warn the personnel 35 that he is in a danger zone of the hovering or landed helicopter 10. The control 42 sends signals to the scanning motor 33 and data processor 37 while the motor 33 sends a beam scan angle signal over line 43 to the data processor. A helicopter part range-blanking control 44 sets range and angle data for the data processor to ignore or to blank out those areas where the beam scan crosses helicopter parts, especially the legs supporting the skids (or wheels) of the helicopter 14, the anti-torque tail rotor 16 and the fuselage 13, so as not to give a continuous obstacle warning every time the rotating beam passes these or other portions of the helicopter. This can be accomplished by blanking out the known angular position for each of the helicopter parts that the beam will impinge upon during each rotation or, alternatively, by setting a minimum range for the scanning beam system which does not recognize as an obstacle the fuselage parts within the minimum range. The line 45 provides a scan coverage angle select to the data processor 37, line 46 provides a pilot or ground personnel warning select and line 47 provides maximum and minimum range selection to the data processor 34 from the control system 42. Line 43 provides beam angle from angle pick offs within the motor 33 to the data processor 37.

Figure 9:
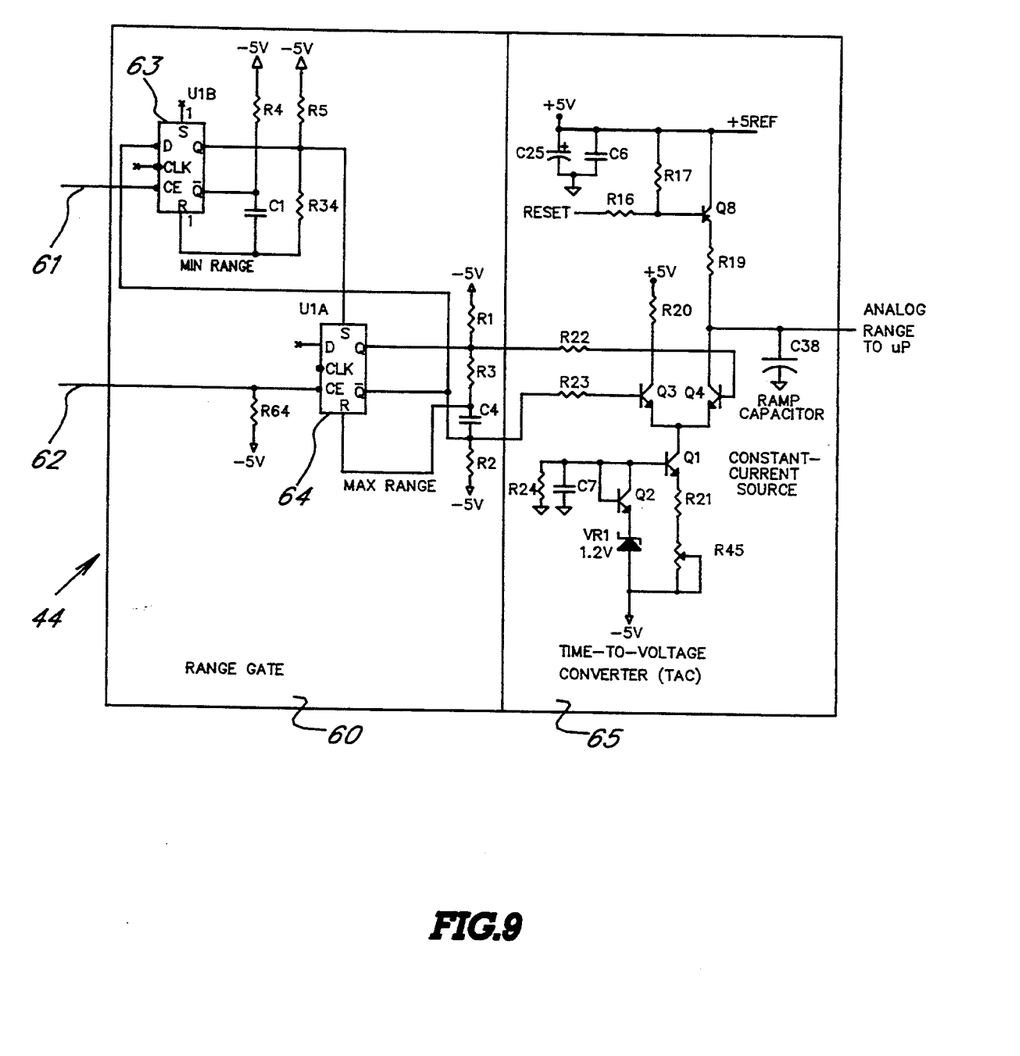
FIG. 9 is a schematic diagram of a range measurement blanking circuit.

FIG. 9 illustrates a range measurement and range gate (or blanking) circuit 44 of FIG. 5 in which the circuit has a range gate portion 60 having a start input 61 which receives a pulse from the laser transmitter and a stop input 62 which receives a pulse from the laser receiver. Pulse 61 is fed into a first clock circuit 63 which clocks the time from the transmission of the laser transmitter pulse while a second clocking circuit 64 clocks the pulses being received from the laser receiver so that the time delay between the timing of the pulses 61 being transmitted and the pulses being received 62 determines the minimum and maximum range to be blocked out. Pulses that are being received back in a shorter time span indicates an object is closer and can be blanked out to set the minimum range while pulses that are received in a larger time span indicate a greater range and, if outside the maximum range, are blanked out. Only the pulses within the operating range are fed from the range gate 60 to the time-to-voltage converter 65. The time-to-voltage converter 65 converts the pulses to an analog range signal which signals are fed from the range measurement and range gate (or blanking) circuitry 44 into the data processor 37. During the operation of the system, the data processor receives inputs on the object range from the range finder, the object angle from the range finder, as well as aircraft part range input, and aircraft part angle input, along with maximum and minimum range selects determined by the circuit 44 and the angle sector select inputs. Also received into the data processor are pilot audible warnings select, pilot visual warning select, and ground personnel warning select signals and rotor blade danger zones based on X and Y coordinates. The data processor then produces outputs of a pilot's audible alarm or pilot's visual display and the ground personnel audible alarm.

Figure 10:
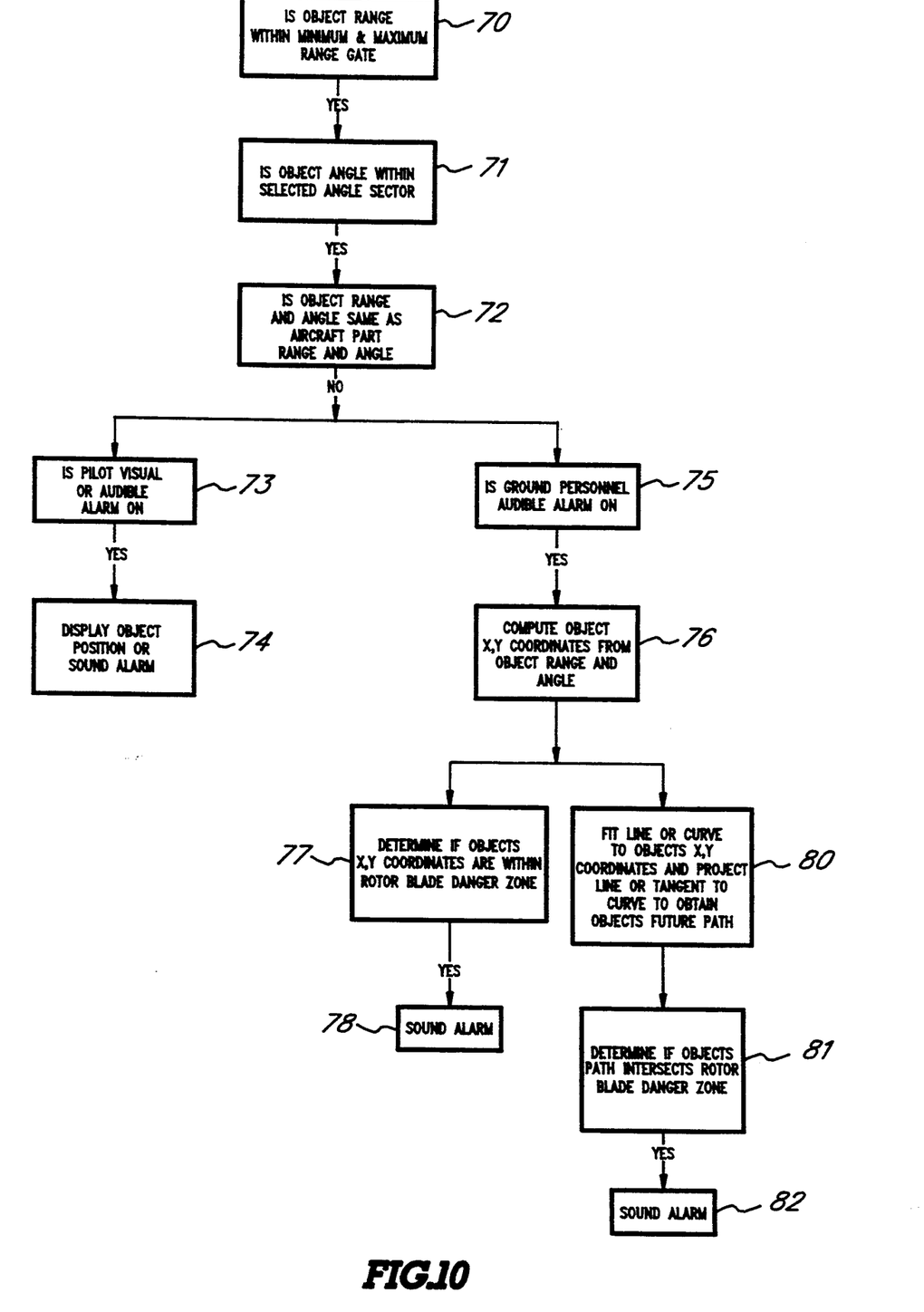
FIG. 10 is a flow diagram of the software.

FIG. 10 illustrates a flow diagram of the software operation used in controlling the data processor and begins with determining whether the object range is within the minimum or maximum range gate (70) as determined by the range gate circuitry 44 and if yes, determines whether the object angle is within the selected angle sector (71). If this is also yes, a determination is made whether the object range and angle are the same as the aircraft part and range angle (72) and, if not, one branch circuit determines if the pilot's visual audible alarm is on (73) and if so, then if the display object position or sound alarm (74) is turned on. The other branch circuit determines whether the ground personnel audible alarm is on (75) and, if it's on, computes the object's X,Y coordinates from the object range and angle (76). One branch then determines if objects in the X,Y coordinates are within the rotor blade danger zone (77) and, if so, turn on the sound alarm (78). The other branch determines the best fit line or curve to the objects at the X,Y coordinates and projects a line or tangent to the curve to obtain the objects future path (80) and then determines if the objects path intersects the rotor blade danger zone (81) and, if so, turns on the sound alarm (82).

In operation, once the helicopter 10 is started, the laser rangefinder transceiver 30 is turned on which generates a laser beam 31 within the select frequency of the particular laser used in the rangefinder which impinges upon the scanning optics 32 which are being rotated by the motor 33 to scan the beam 34 in a horizontal or quasi-horizontal plane around the helicopter 10 fuselage. The beam 34 impinges upon obstacles, such as personnel 35 or a tree 36, and gives an echo or return signal back to the rotating optics 32 and back to the laser rangefinder transceiver 30 indicating the distance to the obstacles 35 and 36. This information is fed back to the data processor 37 having a microprocessor which computes the position of the obstacles which are then fed to the audible warning 38 and to the visual warning screen 40 and which may produce a ground personnel audible warning 41. The operation is controlled from a control system 42 which activates the electric motor 33 which rotates the optics 32. The control system 42 also provides maximum and minimum range selection 47, scan angle coverage 45 and pilot or ground personnel warning select 46 to the data processor 37. Rotation angle information is provided from the motor 33 to the processor 37 to allow the processor 37 to determine the position of the obstacles 35 and 36 from the distance and angle to each object for displaying precise positioning information on a screen 40. A blanking input 44 is provided to the processor 37 to blank out return signals from helicopter parts. The laser rangefinder 30 operates at a high data pulse rate in order to provide continuous angular obstacle coverage at high scan rates.

The present invention also includes the process of giving a hazardous ground object warning for helicopters including the transmitting of a pulsed laser rangefinder beam from the helicopter adjacent to the bottom fuselage, rotating the transmitted beam in a horizontal or quasi-horizontal plane, receiving an echo or reflected signal when the laser beam is reflected from an obstacle, and determining the position and range of the obstacle while setting minimum and maximum ranges of operation for the laser rangefinder and blanking out return signals from helicopter body parts. The steps also include generating an audible warning to the pilot, an audible warning to personnel within the rangefinder's range, and a pilot's visible screen warning and positioning of obstacles.

Figure 7:
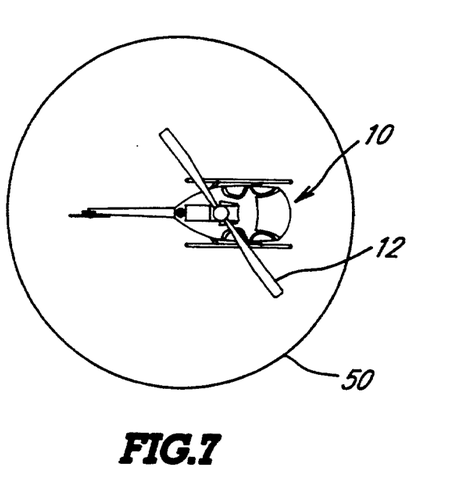
FIG. 7 shows a top plan view having the main plus tail rotors warning scan.

FIG. 7 illustrates helicopter 10 having the present obstacle warning system showing the circular coverage for the hazardous ground object warning system in accordance with the present invention shown by the circular scan pattern 50.

Figure 8:
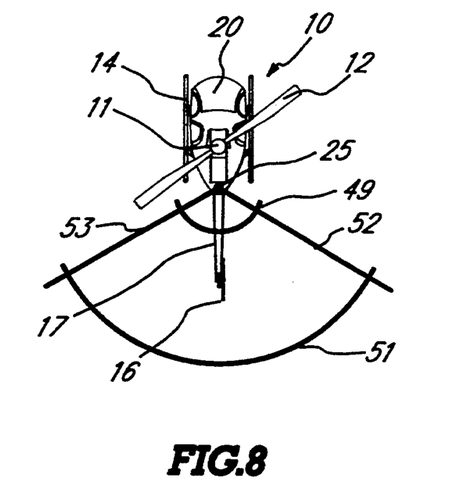
FIG. 8 shows a top plan view having a tail rotor warning scan.

FIG. 8 shows a similar view of the helicopter 10 having an angular coverage indicated by the arc 51 limited by the angle legs 52 and 53 to cover the portion of the tail rotor for giving a warning of anything coming near or approaching the anti-torque tail rotor as the tail boom 17 moves or as ground personnel move.

Figure 6:
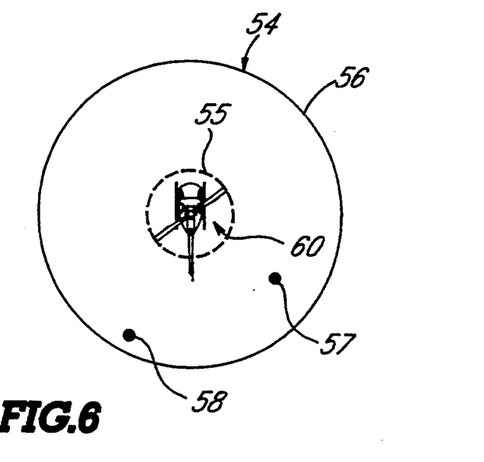
FIG. 6 illustrates a pilots visual display.

FIG. 6 shows a pilot visual display which has a circular screen 54 showing a representation of the rotor blade circle 55 and a maximum range 56 for the rangefinder for the helicopter 10 and having a pair of hazardous objects 57 and 58 at different positions within the hazardous zone. The screen 54 would indicate the maximum range and would display, as shown, hazardous objects as blips relative to a diagrammatic helicopter 60 on the screen face having a circle 55 thereon showing the maximum extent of the main rotor blades.

Figure 11:
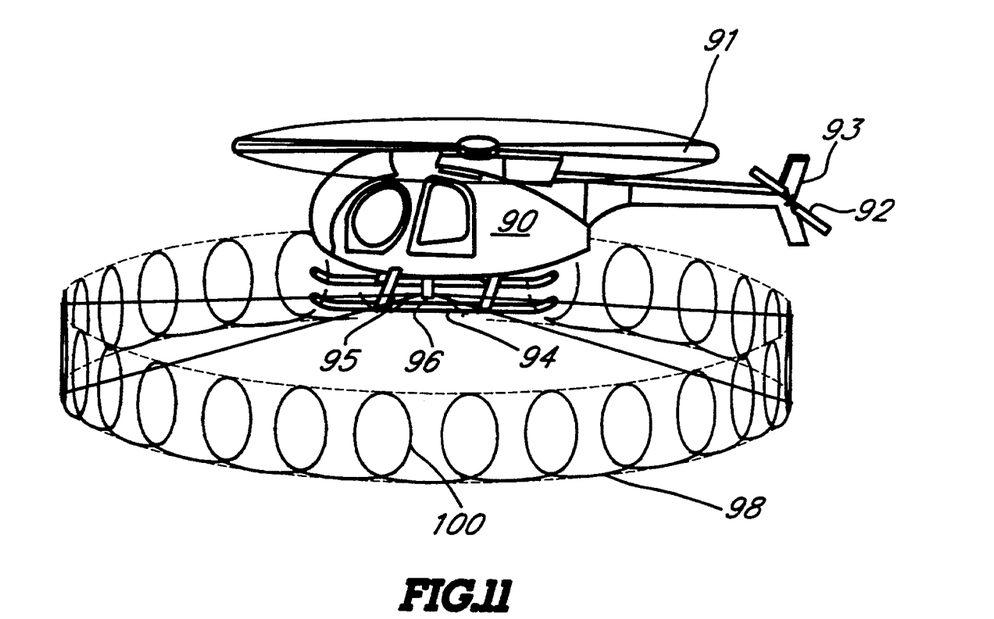
FIG. 11 is a side elevation of a helicopter and laser scanning beam.
Figure 13:
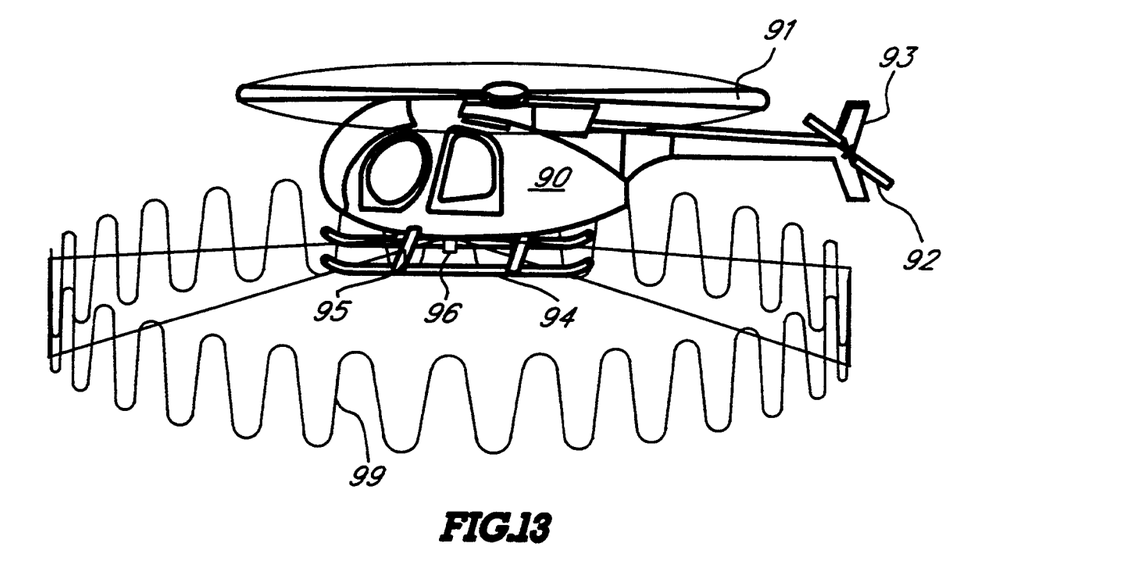
FIG. 13 is a side elevation of a helicopter of FIG. 11 with a modified laser scanning beam.

In FIGS. 11 and 13, alternate embodiments of scanning patterns are illustrated in which a helicopter 90 has a main rotor 91 and a torque rotor 92 on the tail 93 thereon. The helicopter has skids 94 supported by legs 95. The beam rotating optics are attached in a housing 96 attached to the fuselage 97 and, in FIG. 11, produce a circular beam as indicated by the dashed lines 98 and simultaneously produce circular or inner spiraling beam portions 100 to produce a wobbulating type rotating pattern.

For the detection of trees, poles, buildings, men and other vertically oriented objects, a horizontal planer scan pattern is optimum since the scanning beam will always intersect the object. However, for horizonal wires, beam interception and detection will depend on the beamwidth (height) of the scanning beam. Since the laser beamwidth determines the laser power density intercepted by the wire, it is desirable to have a very small beam to provide sufficient power density to detect wires while at the same time keeping the laser output power below the eye safety threshold. Therefore, the beamwidth requirement for optimum wire detection conflicts with the beamwidth requirement for eye safety. One wants to be large, the other small. Another embodiment of this invention utilizes a very small laser beam scanned horizontally, 360° about the aircraft, in a pattern that has frequent and periodic vertical variations 99 as shown in FIG. 13. Such patterns will greatly increase the probability of horizontal wire detection since they scan a much wider vertical angle sector. Two methods of generating these complex scan patterns are shown in FIGS. 12 and 14.

Figure 12:
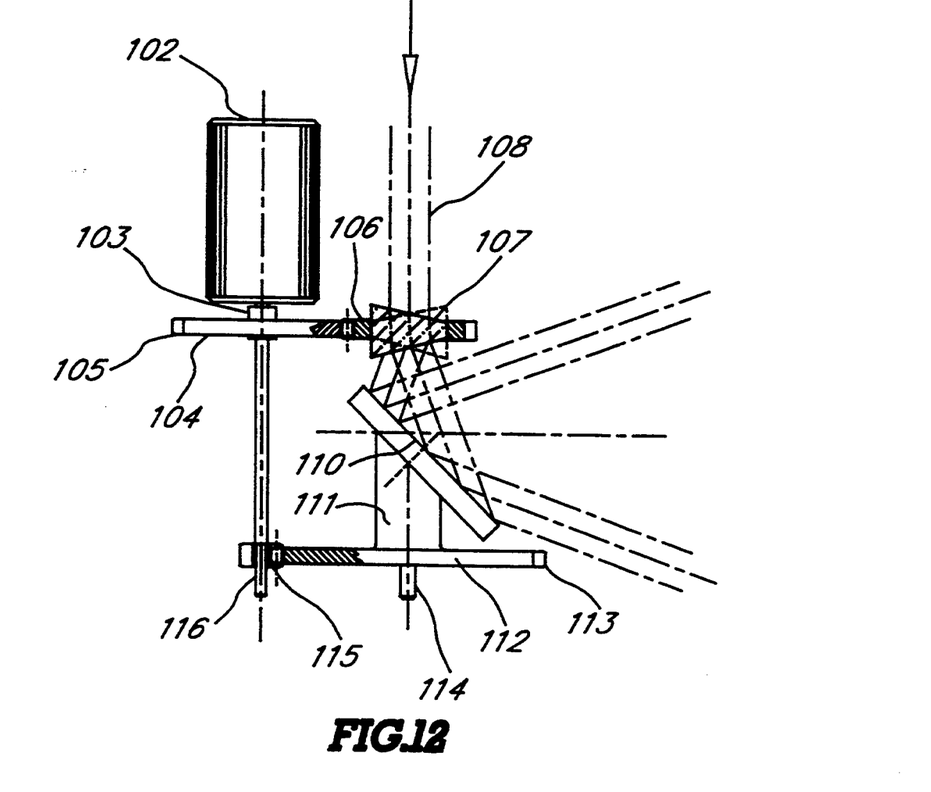
FIG. 12 is a cut-away side elevation of a second embodiment of the beam rotating optics.

Referring to FIG. 12, an electric motor 102 is attached in the housing 96 of FIG. 11 and rotates the motor shaft 103 which in turn rotates a gear 104 mounted thereto which has teeth 105 which rotates a prism supporting gear 106 which rotates the prism 107 having the transmitted laser beam 108 passing therethrough. This constantly changes the refraction of the laser beam due to the rotation of the prism 107. The laser beam exiting the prism 107 is impinged upon a rotating scanning (mirrored) surface 110 supported on a mirror mount 111 which is supported on a gear 112 having teeth 113 and supported on a shaft 114. The gear is driven by a rotating pinion gear 115 on the shaft 116 connected to the motor shaft 103 so that the angled scanning mirror 110 is rotated by the shaft 116 as is the rotating prism 107 but at different speeds because of the difference in the gears 104 and 115. Thus, the scanning mirror 110 in rotating prism 107 is rotated at a different speed and if the rotation of the prism 107 is much greater than the rate of the scanning mirror, the scan pattern is generated as shown in FIG. 11.

Figure 14:
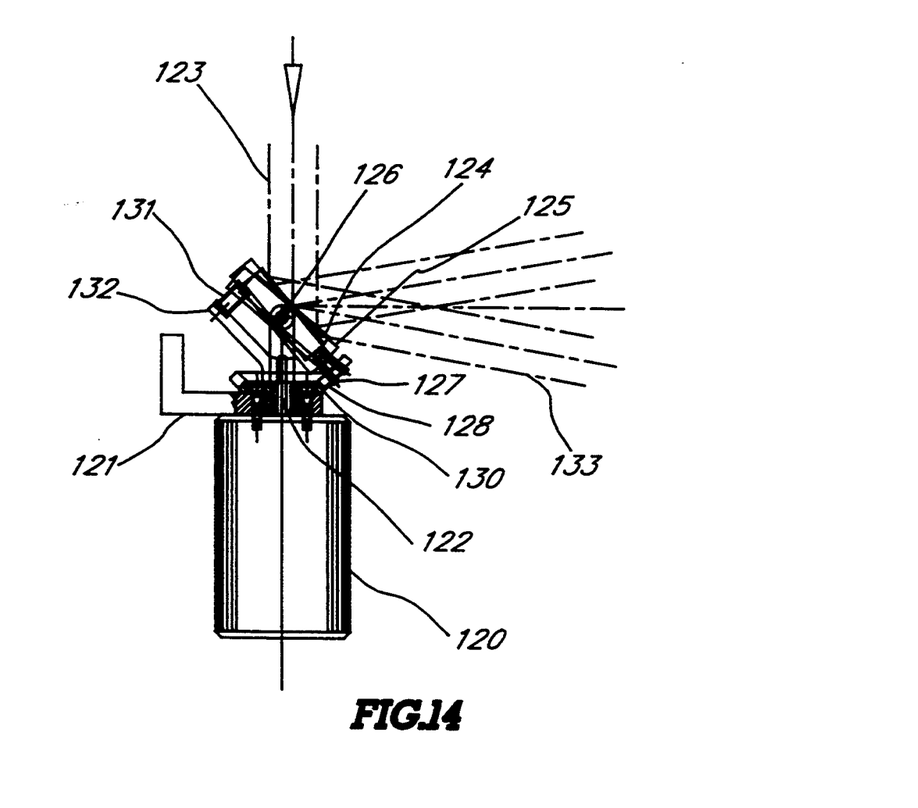
FIG. 14 is a cut-away side elevation of another embodiment of the beam rotating optics for the scanning beam of FIG. 13.

Referring to FIG. 14, a second method for generating a wobbulating or periodically tilting scanning laser beam 99 as shown in FIG. 13 is shown having an electric motor 120 bolted to the housing 121 and having an electric motor shaft 122. The incoming transmitted laser beam 123 impinges upon the scanning mirror 124 which rotates responsive to the rotation of the shaft 122 and is mounted in a scanning mirror support 125 movably supported on a shaft 126 and has a shaft 127 on the end of the support 125 having a rotating gear 128 rotating on the shaft 127 and riding in a fixed annular gear surface 130. The opposite end of the housing 125 has a compression spring 131 mounted between the housing and a rotating support member 132 which continuously presses the housing on the shaft 126 to push the rotating gear at 128 against the gear surface 130 which is made to force the scanning mirror 124 to wobbulate or periodically tilt. That is, the edge of the mirror rides on a race (or track) that is designed to create the periodic vertical mirror wobble as it rotates horizontally to produce a rotating and wobbling beam 133. The pattern of rotation varies with the race design and the sweep rate.

It should be clear at this time that a helicopter hazardous ground object warning system has been provided which will alert a helicopter pilot during hover, takeoff, or landing that the helicopter's main rotor blade, tail rotor blade, or fuselage are approaching a ground based object that would be hazardous to the helicopter in a collision and will also alert ground personnel approaching a landing helicopter that they are in the near vicinity of or approaching hazardous spinning main or tail rotors. However, the present invention is not to be construed as limited to the forms shown which are to be considered illustrative rather than restrictive.

I claim:

1. A helicopter pilot and ground personnel hazard warning system comprising:
    a helicopter having a fuselage and at least one rotor having blades attached thereto;
    a laser rangefinder having a laser for transmitting a laser beam and a receiver for receiving a reflected light signal from said transmitted laser beam, said laser rangefinder being mounted to said helicopter;
    rotating mirror system for rotating the laser beam of said laser rangefinder 360° and for receiving the reflected signal from said laser beam and directing the reflecting signal to said rangefinder receiver, said rotating mirror system having a motor driven rotating mirror;
    a warning signal system for issuing a warning signal to ground personnel;
    data processing circuit coupled to said laser rangefinder and to said warning signal system for processing rangefinder data and activating said warning signal system to issue a warning signal and
    a blanking circuit connected to said data processing circuit for blanking out predetermined ranges of laser beam signals, whereby a helicopter pilot is warned of ground hazards to the helicopter and ground personnel are warned of hazards from the helicopter.

2. A helicopter pilot and ground personnel hazard warning system in accordance with claim 1 which said blanking circuit blanks signals between predetermined angles of said rotating laser beam to thereby block return signals of predetermined helicopter components within the rotating laser beam path of rotation.

3. A helicopter pilot and ground personnel hazard warning system in accordance with claim 2 including means for varying the angle for blanking signals in said blanking circuit.

4. A helicopter pilot and ground personnel hazard warning system in accordance with claim 1 including means for varying the maximum and minimum range of said rangefinder.

5. A helicopter pilot and ground personnel hazard warning system in accordance with claim 1 in which said warning signal system includes a pilot audible warning signal of hazards to said helicopter.

6. A helicopter pilot and ground personnel hazard warning system in accordance with claim 1 in which said warning signal system includes a pilot visual warning signal including a screen showing the position of detected hazardous objects.

7. A helicopter pilot and ground personnel hazard warning system in accordance with claim 1 in which said warning signal system includes a ground personnel audible warning signal exterior of said helicopter for warning personnel within a hazardous area adjacent said helicopter.

8. A helicopter pilot and ground personnel hazard warning system in accordance with claim 1 in which said rotating mirror system includes a rotating mirrored prism mounted to the fuselage of said helicopter for rotating said laser beam approximately parallel to the earth surface.

9. A helicopter pilot and ground personnel hazard warning system in accordance with claim 8 in which rotating mirror system includes a motor driving said rotating prism.

10. A helicopter pilot and ground personnel hazard warning system in accordance with claim 1 in which the rotating wobbulating mirror includes a mounted mirror having an idler gear thereon riding on an arcuate rack shaped to control the mounted mirror wobble path.

11. A helicopter pilot and ground personnel hazard warning method comprising the steps of:
    transmitting a laser rangefinder laser beam from a helicopter;
    rotating said transmitted laser beam adjacent the fuselage of said helicopter in a predetermined pattern thereabout;
    receiving a signal reflected off an object in a region of coverage of said laser rangefinder from said laser beam impinging upon the object;
    setting minimum and maximum ranges of operation of said laser rangefinder;
    blanking out predetermined angles of said laser beam signals whereby helicopter components intersecting said rotating laser beam do not issue warning signals;
    generating a warning signal of a hazardous object in said laser rangefinder's range and to personnel in a hazardous position relative to said helicopter whereby a pilot is warned of objects within a predetermined range of said helicopter and personnel near said helicopter are warned when in a dangerous position near said helicopter.

12. A helicopter pilot and ground personnel hazard warning method in accordance with claim 11 in which the step of generating a warning signal includes generating an audible warning signal exterior of said helicopter to warn personnel in a hazardous position near the helicopter.

13. A helicopter pilot and ground personnel hazard warning system comprising:
    a helicopter having a fuselage and at least one rotor having blades attached thereto;
    a laser rangefinder including a laser for transmitting a laser beam and a receiver for receiving a reflected light signal from said transmitted laser beam, said laser rangefinder being mounted to said helicopter;
    a laser beam rotation system for rotating the laser beam of said laser rangefinder and for receiving a reflected light signal from said laser beam in said laser rangefinder receiver, said beam rotation system including rotating optics positioned adjacent said helicopter fuselage for directing said laser beam along a predetermined beam path;
    data processing circuit for processing said rangefinder data to issue a warning signal, said data processing circuit including means for setting minimum and maximum ranges of acceptable signals for generating said warning signals and for blanking predetermined angles of laser beam rotation to negate warning signals from helicopter components in the laser beam signal path, whereby a helicopter pilot is warned of ground hazards to the helicopter and ground personnel near the helicopter are warned when in a hazardous position.

14. A helicopter pilot and ground personnel hazard warning system in accordance with claim 13 in which said data processing circuit determines the maximum and minimum range and the position of ground personnel for valid acceptable data for issuing a warning signal.

15. A helicopter pilot and ground personnel hazard warning system in accordance with claim 14 in which said warning signals includes pilot audible and visual warning signals.

16. A helicopter pilot and ground personnel hazard warning system in accordance with claim 15 in which said pilot visual warning signals includes a visual display having a screen showing the position of detected hazardous objects.

17. A helicopter pilot and ground personnel hazard warning system in accordance with claim 14 in which said warning signals includes ground personnel audible warning signals.

18. A helicopter pilot and ground personnel hazard warning system in accordance with claim 14 in which said beam rotation system includes rotating optics attached said helicopter for rotating said laser beam approximately parallel to a horizontal plane above the earth.

19. A helicopter pilot and ground personnel hazard warning system in accordance with claim 16 in which beam rotation system has electric motor mounted to said helicopter and attached to said beam rotating optics for rotating said optics when actuated.

* * * * *